(12) United States Patent
Schneider et al.

(10) Patent No.: US 8,753,046 B2
(45) Date of Patent: Jun. 17, 2014

(54) DRILLING TOOL FOR MACHINE TOOLS AND METHOD FOR THE PRODUCTION THEREOF

(75) Inventors: Rico Schneider, Pleidelsheim (DE); Gerhard Stolz, Ingersheim (DE)

(73) Assignee: Komet Group GmbH, Besigheim (DE)

( * ) Notice: Subject to any disclaimer, the term of this patent is extended or adjusted under 35 U.S.C. 154(b) by 1072 days.

(21) Appl. No.: 12/733,268

(22) PCT Filed: Jul. 29, 2008

(86) PCT No.: PCT/EP2008/059918
§ 371 (c)(1),
(2), (4) Date: Feb. 18, 2010

(87) PCT Pub. No.: WO2009/033878
PCT Pub. Date: Mar. 19, 2009

(65) Prior Publication Data
US 2010/0150673 A1    Jun. 17, 2010

(30) Foreign Application Priority Data
Sep. 6, 2007  (DE) .......................... 10 2007 042 279

(51) Int. Cl.
   *B23B 51/02*    (2006.01)
(52) U.S. Cl.
   USPC ............. 408/57; 408/230; 408/713; 76/108.6
(58) Field of Classification Search
   USPC ............. 408/1 R, 58, 57, 230, 231, 226, 238, 408/713, 239 R, 227, 229, 56, 59, 239 A; 76/108.6, 108.1
   See application file for complete search history.

(56) References Cited

U.S. PATENT DOCUMENTS

| 319,614 | A | * | 6/1885 | Pendleton | ...................... 408/230 |
| 437,187 | A | * | 9/1890 | Fenner et al. | ................. 408/230 |
| 589,576 | A | * | 9/1897 | Rickey | ............................ 408/59 |

(Continued)

FOREIGN PATENT DOCUMENTS

| DE | 29 45 635 A1 | 5/1981 |
| DE | 696 21 030 T2 | 11/2002 |

(Continued)

OTHER PUBLICATIONS

German Patent Office Search Report dated Jul. 14, 2008 (4 pages).

(Continued)

*Primary Examiner* — Eric A Gates
*Assistant Examiner* — Paul M Janeski
(74) *Attorney, Agent, or Firm* — Flynn, Thiel, Boutell & Tanis, P.C.

(57) ABSTRACT

A drilling tool for machine tools has a drill body and a cutting head arranged on the front face of the drill body. The drill body has at least two chip flutes, which are delimited at their flanks by ribs and at least one of which is spirally curved. Arranged in the ribs of the drill body are coolant channels, which have an outlet opening at the end of the drill body on the cutting head side. A special feature is that the outlet openings are arranged within each one of the chip flutes and communicate with one of the coolant channels arranged in the ribs by way of a straight channel endpiece.

11 Claims, 3 Drawing Sheets

(56) References Cited

U.S. PATENT DOCUMENTS

Figures 1A, 1B:
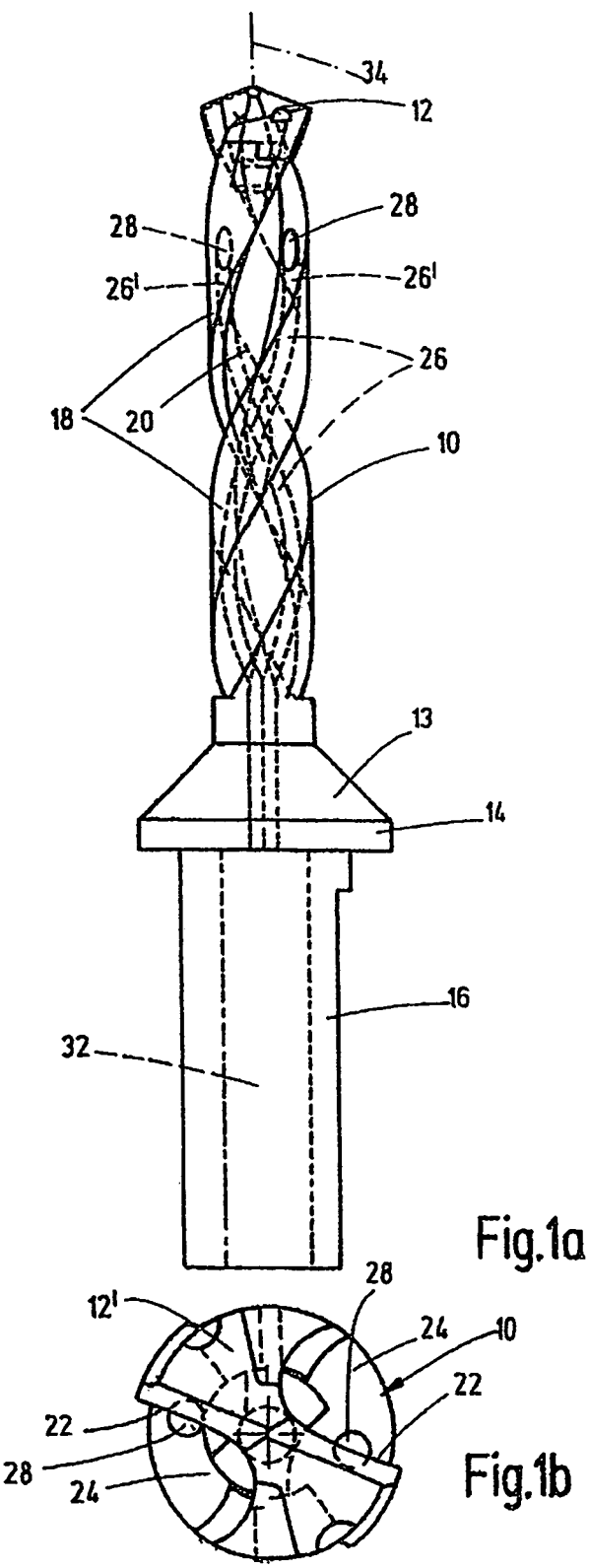

| | | | | |
|---|---|---|---|---|
| 1,384,733 | A * | 7/1921 | Woods | 408/56 |
| 1,641,321 | A | 9/1927 | Cubley | |
| 2,348,874 | A * | 5/1944 | Andreasson | 408/57 |
| 2,646,701 | A * | 7/1953 | Letien | 408/56 |
| 3,504,575 | A * | 4/1970 | Masao et al. | 76/108.1 |
| 3,555,935 | A * | 1/1971 | Dorrenberg | 76/108.6 |
| 3,791,660 | A * | 2/1974 | Bostley | 279/20 |
| 4,704,055 | A * | 11/1987 | Guhring | 408/59 |
| 5,676,499 | A | 10/1997 | Tukala | |
| 5,865,574 | A | 2/1999 | Tukala | |
| 6,030,155 | A * | 2/2000 | Scheer et al. | 408/59 |
| 6,045,301 | A * | 4/2000 | Kammermeier et al. | 408/57 |
| 6,113,321 | A * | 9/2000 | Mulroy et al. | 408/211 |
| 6,821,061 | B2 * | 11/2004 | Frejd | 408/59 |
| 7,101,125 | B2 * | 9/2006 | Borschert et al. | 408/230 |
| 7,306,411 | B2 * | 12/2007 | Mabuchi et al. | 408/230 |
| 7,476,067 | B2 | 1/2009 | Borschert et al. | |
| 2005/0031423 | A1 * | 2/2005 | Kugelberg et al. | 408/230 |
| 2006/0204345 | A1 | 9/2006 | Borschert et al. | |
| 2007/0020054 | A1 * | 1/2007 | Bruhn et al. | 408/59 |

FOREIGN PATENT DOCUMENTS

| | | |
|---|---|---|
| DE | 103 33 340 A1 | 2/2005 |
| DE | 20 2005 020 829 U1 | 11/2006 |
| EP | 0 883 455 B1 | 12/1998 |

OTHER PUBLICATIONS

International Search Report dated Oct. 13, 2008 (4 pages).

* cited by examiner

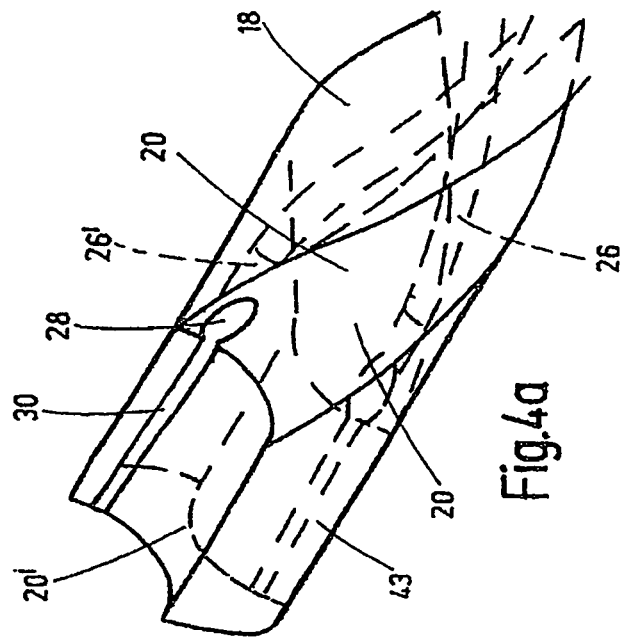
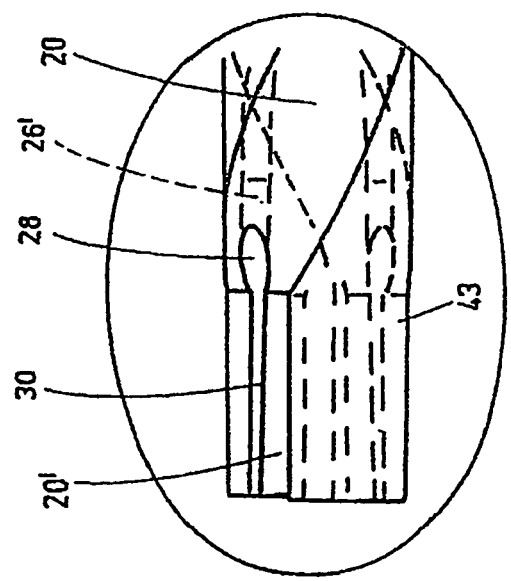

DRILLING TOOL FOR MACHINE TOOLS AND METHOD FOR THE PRODUCTION THEREOF

The invention relates to a drilling tool for machine tools having a drill body and having a cutting head which is arranged at the end on the drill body, wherein the drill body has two chip flutes which are bounded on their flanks by ribs, at least one of which is curved in a helical shape, wherein coolant channels are arranged in the ribs of the drill body, at least one of which is curved in a helical shape and has an outlet opening at the cutting-head end of the drill body. The invention furthermore relates to a method for the production of a drilling tool comprising a drill body having an end cutting head and having an end shank, in which a base material body is turned on the drilling body contour forming a rotationally symmetrical first blank, at least two deep-hole bores are incorporated in the first blank which deep-hole bores are arranged at a distance from one another and extend in the direction of the shank of the blank from points which are arranged eccentrically with respect to a central axis on the end face of the cutting-head blank end, and in which the second blank, which has been prefabricated in this way is heated to a predetermined temperature at clamping-in points which are arranged at an axial distance from one another, in a zone located between these clamping-in points and is twisted plastically in a helical shape through a predetermined angle.

In the case of a drilling tool of this type, it is known (EP 0 883 455 B1) for the deep-hole bores and the chip flutes to be incorporated in an untwisted base material body, and for the blank which has been prefabricated in this way then to be heated to a predetermined temperature at clamping-in points which are arranged at an axial distance from one another, in a zone located between these clamping-in points and is twisted plastically in a helical shape while the chip flutes and the coolant channels are rotated at the same time. In this case, the coolant channels emerge from the drill body at the end-face ends of the ribs. Since the cutters of the cutting head, which is formed by retrospectively inserted cutting inserts or by a drill bit placed thereon are adjacent to the chip flutes in the area of their cutting surface, the coolant channels must be closed at their end-face ends and must be deflected through tap holes in the direction of the chip flutes. This measure involves additional production effort. Furthermore, the deflection of the coolant channels leads to an undesirable pressure loss.

Against this background, the present invention is based on the object of improving the known drilling tool and the known method for the production thereof in such a way as to ensure that the coolant channels are introduced more easily, and to ensure an improved flow profile at the outlet point of the coolant channels.

Combinations of features are proposed in order to achieve this. Advantageous refinements and developments of the invention are also specified below.

The solution according to the invention is based on the knowledge that an untwisted area is created outward from the clamping-in points when a blank that has been provided with deep-hole bores is twisted. If the chip flutes are incorporated in the drill body in a helical shape following the twisting process, preferably being milled in, and the helical milling process is continued into the untwisted cutting-head end of the blank, the straight channel end piece which is located there is milled so as to form an outlet opening which opens into the chip flute.

In order to achieve this, the invention proposes that the outlet openings are arranged within in each case one of the chip flutes and communicate with in each case one of the coolant channels via a straight channel end piece. In this case, the outlet openings have an oval or egg-shaped outline which is elongated in the direction of the chip flutes. In principle, it is also possible for the outlet openings to form a groove which is open at the edge and runs along the chip flutes, or for grooves which are open at the edge and run in the direction of the cutters to be adjacent to the outlet opening within the chip flutes. In this case, the chip flutes can also be at least partially untwisted at the cutting-head end along the cooling channels.

During the production of the drilling tool according to the invention, attention is paid in the method according to the invention to ensure that a number of chip flutes corresponding to the number of deep-hole bores are milled in in a helical shape in the twisted blank which has been provided with the deep-hole bores, such that the twisted deep-hole bores run within ribs which remain between adjacent flanks of the chip flutes, and such that the deep-hole bores are milled on the cutting-head side, in an untwisted straight area, forming outlet openings which open into the chip flutes. A holder for at least one cutting insert, which forms the cutting head, or for a drill bit is then incorporated in the cutting-head end of the fourth blank which has been formed in this way, in the immediate vicinity of the outlet openings. The cutting-head end of the fourth blank is advantageously shortened after the chip flutes have been milled in.

In principle, it is also possible to arrange grooves in the cutting head, which grooves communicate with the grooves and/or coolant channels in the drill body. The chip removal can be improved by the chip flutes becoming steeper toward the shank end of the drill body. It is therefore advantageous for the coolant channels to also run more steeply toward the shank end of the drill body.

During the course of production, the deep-hole bores can be incorporated in the relevant blank either parallel to or inclined with respect to one another at the same or at different distances from a central axis. The deep-hole bores are in this case milled on the cutting-head side, in their untwisted straight area, expediently forming outlet openings with an oval or egg-shaped outline. This results in the outlet openings having an outline which is elongated in the course of the chip flutes. One advantageous refinement of the invention provides that the deep-hole bores are milled on the cutting-head side in their untwisted straight area forming grooves which are open at the edge and are aligned in the profile of the chip flutes. In order to achieve this, it is advantageous for the chip flutes to be milled in the untwisted area of the deep-hole bores with an increasing helix pitch, or without any helix, essentially parallel to the deep-hole bores, and for the deep-hole bores to in this case be milled forming grooves which are open at the edge. In principle, it is possible to mill additional grooves, which are open at the edge, into the chip flutes following the incorporation of the chip flutes.

Figure 2A:
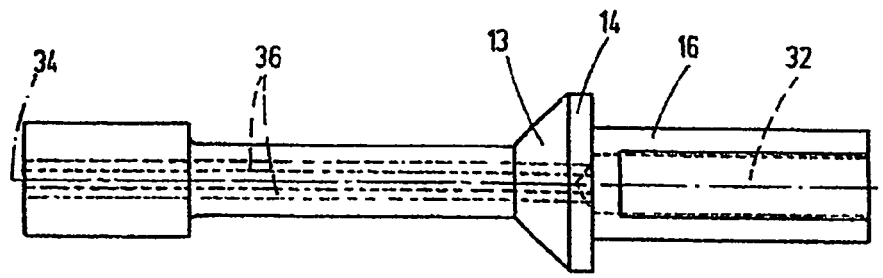
Figure 2B:
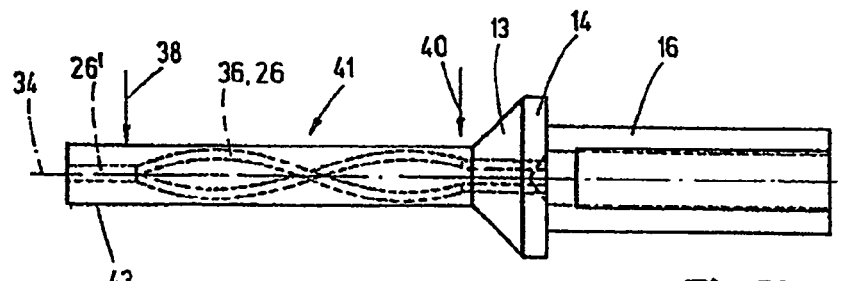
Figure 2C:
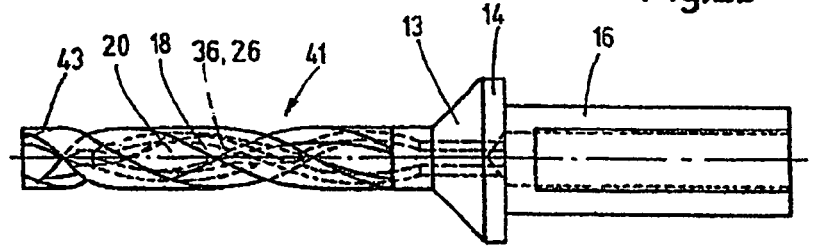
Figure 3:
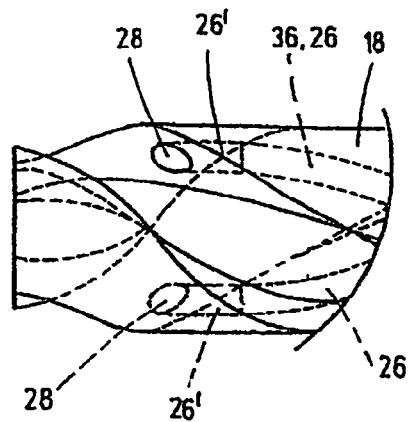

The invention will be explained in more detail in the following text with reference to exemplary embodiments which are illustrated schematically in the drawing, in which:

FIGS. 1a and 1b show a side view and a plan view of an interchangeable head drill;

FIGS. 2a to c show the process for the production of a twisted drill body comprising a blank which has been turned to a drilling body contour;

FIG. 3 shows an enlarged detail of the cutting-head end of the helical drill body blank and FIGS. 4a and b show a diagrammatic illustration and a side view of the cutting-head-side drill body blank with a coolant channel outlet in the form of a groove.

The drilling tool illustrated in the drawing is intended for use in machine tools and has a drill body 10, a cutting head 12 which is arranged at the end on the drill body 10 and is in the form of a drill bit, as well as a shank 16, which is connected to the drill body 10 via a stop collar 14 and can be clamped in a tool holder, which is not illustrated. The drill body 10 contains two chip flutes 20 which are bounded on their flanks by ribs 18 and extend on the cutting-head side into the chip surfaces 24, which are bounded by the cutters 22, within the drill bit 12'. In the exemplary embodiment shown in FIGS. 1a and b, the chip flutes 20 and their boundary ribs 18 are in the helical spiral shape over the entire length of the drill body. Furthermore, there are coolant channels 26 in the drill body, which run in a helical shape within the majority of the ribs 18 with the same pitch and which merge into a straight channel section 26' toward the cutting-head end. The channel sections 26' are cut there from the helical chip flutes 20, forming an oval outlet opening 28 which points into the chip flute. The outlet openings are positioned such that they are directed via the chip surface 24 at the associated cutters 24 of the drill bit 12'.

As can be seen from FIGS. 4a and b, it is possible to leave that part 20' of the chip flutes which is on the cutting-head side without a helix, and to lengthen the outlet opening 28 by means of an elongated groove 30 for the coolant outlet.

In principle, it is also possible to incorporate grooves which are open at the edge in the cutting head, which, in the assembled state, communicate with the outlet openings 28 in the drill body 10. This improves both the cooling and the chip conveyance. The chip conveyance can also be improved by the chip flutes becoming steeper toward the shank end of the drill body. The coolant channels accordingly also run more steeply toward the shank end of the drill body.

As can be seen from FIGS. 1a and 1b, the cutting head 12 is in the form of a drill bit, and the drill body has a coupling holder for a coupling part which is arranged on the drill bit.

As can be seen from FIGS. 2a to c, the drill body 10 is produced in the following process steps:
First of all, a cylindrical base material body is turned on a drilling body contour in a lathe, and is provided with the shank 16 and with the conical transition 13 to the stop collar 14. Still in the lathe, a central bore which forms the supply channel 32 is incorporated from the shank end into the area of the stop collar 14. Furthermore, two deep-hole bores 36, which are eccentric with respect to the central axis 34, are incorporated from the cutting-head end face, and extend to the central supply channel 32 at the shank end of the drill body 10 (FIG. 2a). Finally, the cutting-head end 12 of the drill body 10 is turned to the drill body diameter, and is shortened at the end.

The second blank, which has been prefabricated in this manner, is clamped in at the points 38, 40 indicated by arrows in FIG. 2b and is heated to a predetermined temperature in the zone 41 located between these points 38, 40, and is twisted plastically in a helical shape through a predetermined angle. In consequence, the deep-hole bores 36 are curved in a helical shape with a predetermined pitch, forming coolant channels 26. The deep-hole bores 36 remain in front of the clamping-in point 38 in the cutting-head area, forming the straight channel sections 26' without any twist (FIG. 2b). A corresponding situation applies to the area without a shank away from the clamping-in point 40.

In a third method step as shown in FIG. 2c, the chip flutes 20 are then milled in a spiral shape over the length of the drill body 10, such that the helical coolant channels 26 come to rest in the ribs 18 which bound the chip flutes 20. The helical milling process also continues into the untwisted area 43 of the drill body, thus resulting in the straight channel sections 26' being milled there, forming the oval or egg-shaped outlet opening 28. The position of the outlet openings 28 with respect to the cooling channels 26 with their straight channel sections 26' can be established such that they point in the desired direction within their chip flute (FIG. 2c and FIG. 3) by the relative association of the helical chip flute 20 with respect to the coolant channels 26.

In principle, it is also possible to make the outlet opening 28 longer, in order to form an elongated groove 30 by varying the helix pitch during the milling process. In contrast to this, in the exemplary embodiment shown in FIGS. 4a and b, an untwisted section 20' of the chip flute is incorporated in the cutting-head end of the drill body 10 for this purpose, in which a groove 30 is formed, which runs parallel to the axis from the outlet opening 28, for coolant transport. This measure means that the coolant can reach the cutting-head-end chip surface 24 without any disturbance from the outlet opening 28, from where it can transport the chips created there away more easily.

In summary, the following statement can be made: the invention relates to a drilling tool for machine tools having a drill body 10 and a cutting head 12 which is arranged at the end on the drill body 10. The drill body 10 has at least two chip flutes 20, which are bounded on their flanks by ribs 18 and at least one of which is curved in a helical shape. Coolant channels 26 are arranged in the ribs 18 of the drill body 10, and have an outlet opening 28 at the cutting-head end of the drill body. One special feature is that the outlet openings 28 are arranged within, in each case, one of the chip flutes 20, and communicate via a straight channel end piece 26' with one of the coolant channels 26 which are arranged in the ribs 18.

The invention claimed is:

1. A method of producing a drilling tool having a drill body with an end cutting head and an end shank, comprising the steps of:
   providing a base material body;
   forming the base material body into a rotationally symmetrical blank having a shank end and a cutting head end;
   providing at least two deep-hole bores into the blank which are arranged at a distance from each other and extend in a direction of the shank end of the blank from points which are arranged eccentrically with respect to a central axis on an end face of the cutting-head blank end;
   clamping the blank at clamping-in points which are at an axial distance from one another;
   heating the clamped blank to a predetermining temperature at a zone of the blank provided between the clamping-in points; and
   twisting the clamped blank plastically through a predetermined angle to form a helically-shaped blank,
   wherein a number of chip flutes, corresponding to the number of deep-hole bores, are milled in a helical shape in the helically-shaped blank such that twisted deep-hole bores run within ribs which remain between adjacent flanks of the chip flutes and the deep-hole bores are milled on the cutting head side in an untwisted straight area forming outlet openings which open into the chip flutes.

2. The method as claimed in claim 1, wherein the cutting-head end of the blank is shortened after the chip flutes have been milled in.

3. The method as claimed in claim 1, wherein the deep-hole bores are provided in the blank parallel to or inclined with respect to the central axis.

4. The method as claimed in claim 1, wherein the deep-hole bores are provided in the blank at different distances from the central axis.

5. The method as claimed in claim 1, wherein the outlet openings have an oval or egg-shaped outline.

6. The method as claimed in claim 5, wherein the outlet openings have an outline which is elongated in the profile of the chip flutes.

7. The method as claimed in claim 1, wherein the outlet openings are in the form of grooves which are open at the edge, in the profile of the chip flutes.

8. The method as claimed in claim 7, wherein the chip flutes are milled in the untwisted area of the deep-hole bores without any helix, essentially parallel to the deep-hole bores, and the deep-hole bores form outlet openings which are in the form of grooves which are open at the edge.

9. The method as claimed in claim 1, wherein grooves which are open at the edge, are milled into the chip flutes adjacent to the outlet openings.

10. The method as claimed in claim 1, wherein the cutting head is in the form of a drill bit and grooves which are open at the edge are incorporated in the cutting head and, in the installed state, communicate with the outlet openings in the drill body.

11. The method as claimed in claim 1, wherein after forming the outlet openings, a holder for at least one cutting insert, which forms the cutting head, or for a drill bit is incorporated into the cutting-head end in the immediate vicinity of the outlet openings.

* * * * *